UNITED STATES PATENT OFFICE.

GEORGE S. WILLIAMS, OF EGGLESTON'S SPRINGS, VIRGINIA.

IMPROVEMENT IN HOG-CHOLERA COMPOUNDS.

Specification forming part of Letters Patent No. 208,504, dated October 1, 1878; application filed August 23, 1878.

*To all whom it may concern:*

Be it known that I, GEORGE S. WILLIAMS, of Eggleston's Springs, in the county of Giles and State of Virginia, have invented a new and Improved Medical Compound for the Treatment of Hog-Cholera, of which the following is a full, clear, and exact description, which will enable others skilled in the art to which it appertains to make and use the same.

This invention has relation to medical compounds for the treatment of hog-cholera; and it consists in a composition of the following ingredients, in or about the proportions specified, viz:

Eight (8) pounds of peach-leaves and two (2) pounds of common smart-weed are boiled in four (4) gallons of water until the liquid is reduced to one (1) gallon, which is then strained. Then add one-half ($\frac{1}{2}$) pound soft soap, one (1) ounce of copperas, and one-half ($\frac{1}{2}$) ounce of sulphur. To each pint of the above solution add one (1) table-spoonful of spirits of turpentine.

The remedy is given in the following manner: The first dose is one (1) pint, administered in the usual manner, followed in four or five hours by one-half that quantity. If the animal is improving rapidly, cease the medicine, and give in lieu thereof one pint of a decoction of peach-leaves, to which is added fifteen (15) drops spirits turpentine, every day for several days, or until the animal is entirely well.

The medicine is usually given in the animals' food; but in case they should refuse to eat the food so prepared it will be necessary to forcibly administer it by the ordinary method of "drenching."

Having thus described my invention, and the manner of compounding and using the same, what I claim as new and useful, and desire to secure by Letters Patent of the United States, is—

The herein-described compound for the treatment of hog-cholera, consisting of a decoction of peach-leaves and smart-weed leaves, soft soap, copperas, sulphur, and spirits of turpentine, in or about the proportions set forth.

In testimony that I claim the foregoing as my own I hereby affix my signature in presence of two witnesses.

GEO. S. WILLIAMS.

Witnesses:
 J. H. PORTERFIELD,
 J. F. WILLIAMS.